United States Patent [19]

Cuvelier

[11] 4,222,057
[45] Sep. 9, 1980

[54] RECORDERS
[75] Inventor: Antoine Cuvelier, Paris, France
[73] Assignee: Sefram, Paris, France
[21] Appl. No.: 964,101
[22] Filed: Nov. 27, 1978
[30] Foreign Application Priority Data
Nov. 25, 1977 [FR] France .................................. 77 3546
[51] Int. Cl.³ .......................... G01D 9/00; G01D 9/28
[52] U.S. Cl. .................................... 346/33 R; 346/49
[58] Field of Search ..................... 346/46, 49, 52, 55, 346/33 R

[56] References Cited
U.S. PATENT DOCUMENTS 3,163,486  12/1964  Tomes ................................. 346/49 X
4,112,434  9/1978  Shirai et al. ....................... 346/49 X

FOREIGN PATENT DOCUMENTS 1104055  4/1961  Fed. Rep. of Germany ............. 346/49
1438013  6/1976  United Kingdom ...................... 346/49

Primary Examiner—George H. Miller, Jr.

[57] ABSTRACT

A chart recorder has six pens (26) which traverse respective paths spaced in the direction of chart advance. The input signal for each pen (26) except the first (26a) is sampled and fed into a shift register (50) which has a number of stages related to the spacing between its associated pen (26) and the first pen (26a), and which is clocked at a rate dependent on the speed of chart advance. The delayed signal emerging from the shift register (50) is fed to the pen (26), the effect of the delay being to cause simultaneous events in the different signals to be recorded at the same longitudinal position on the chart. A single shift register (150) can be operated in a multiplex mode to receive all the input signals to be delayed, or the signal samples can be cyclically stored in and extracted from the memory (278) of a microprocessor.

13 Claims, 8 Drawing Figures

RECORDERS

This invention relates to recorders for recording data on charts or other record support members, for example by means of styli.

A typical chart recorder may have six styli for recording six different input signals on a common chart. The chart, in the form of a long strip of graduated paper, is initially wound on a first or supply roller, and extends from that roller past a recording station to a second or take-up roller, to which the free end of the chart is attached. The take-up roller, and, usually, a third or drive roller in frictional engagement with the chart between the other two rollers, are rotated by a precision electric motor (for example, a stepping motor) so that the chart is continuously unwound from the supply roller, past the recording station, onto the take-up roller. At the recording station the six styli, which may for example be ink pens, are arranged to press upon the chart. Each pen is mounted in a respective holder which is carried by a respective bar extending above the chart across its full width. Each holder is arranged to be positioned, say by a potentiometric servo system, along its bar in dependence upon the magnitude of a respective one of the input signals to be recorded. Thus the lateral position of each pen trace on the chart, relative to a datum position somewhere across the width of the chart, is indicative of the magnitude of the respective input signal. If the drive roller is rotated at a constant rate, the longitudinal position of each pen trace is indicative of the time at which the corresponding signal magnitude occurred. Each pen can usefully have a different colour ink to enable the corresponding traces to be clearly distinguished, particularly when these traces come close to neighbouring traces and cross one another at shallow angles, or even become coincident.

However, in order to allow the pen holders to traverse the full width of the chart, the paths or loci they traverse must be spaced from one another longitudinally of the chart so as to avoid mutual obstruction. Consequently, the timescales of the different pen traces are offset from one another, so recordings of events occurring simultaneously in the respective input signals appear on the chart at different longitudinal positions. This makes comparison of the recordings difficult, even with different colour inks, particularly where complicated variations are recorded on a short portion of chart. Furthermore, the chart can usually be advanced past the recording station at any one of a number of predetermined rates, for each of which there is a corresponding and different offset between the timescales. This, combined with the wide range of different signal levels which may occur simultaneously in the different input signals, makes a multi-trace recording so confusing as to be almost impossible to interpret.

According to one aspect of this invention there is provided a recorder for recording a plurality of input signals as a function of a common parameter, comprising: a record support member for supporting recordings; first recording means and at least a second recording means, each arranged to produce on said support member, in response to a respective one of said input signals, a record in accordance with the value of said input signal along a respective locus of points representing possible values of said input signal for any one value of said parameter; means arranged to effect relative movement, having a component transverse to said loci, between said member and said recording means in accordance with the value of said parameter, the locus containing a record produced by said second recording means being spaced in the direction of said relative movement from the locus containing a record produced simultaneously by said first recording means; and means arranged to delay the recording by said second recording means of the value of the associated input signal for any one value of said parameter, relative to the recording by said first recording means of the value of the associated input signal for the same value of said parameter, whereby the respective loci containing records for that value of said parameter are coincident upon said member; the delay means having means arranged to store successive samples of the input signal associated with the second recording means, control means arranged to produce a periodic signal having a frequency dependent upon the speed of said relative movement, and output means arranged to receive from the storage means each said sample after an interval equal to a predetermined number of cycles of said periodic signal following the storage of that sample, whereby said second recording means produces a record corresponding to that sample with a delay, relative to the recording of the input signal associated with said first recording means for the same value of said parameter, determined by said predetermined number and the frequency of said periodic signal.

The delay means delays the input signal to the other recording means by the time it takes the chart to travel from the first to the other recording means, so that simultaneous events in the input signals are recorded at the same longitudinal position. Thus the offset between the pens is compensated, and the time distortion that would otherwise occur is eliminated. Consequently, the ease and accuracy with which the multi-trace recording can be interpreted is enhanced. In particular, the full benefit can be obtained from having each recording means provide a different colour trace, but without the difficulties which have previously arisen owing to the longitudinal offset of each recording means necessary to allow the recording means to traverse the full width of the chart.

By arranging for the delay to be determined in part by the frequency of a periodic signal related to the speed of the chart advance, it is possible to accommodate a wide range of chart speeds without using complex switching circuitry.

The invention can be used irrespective of the number of recording means, the delay in the recording of signals for the third, fourth and any further recording means being related to the respective offset between each of these additional recording means and the first recording means.

A recorder in accordance with this invention for recording six input signals on a chart will now be described, by way of example, with reference to the accompanying drawings in which.

Figure 1:
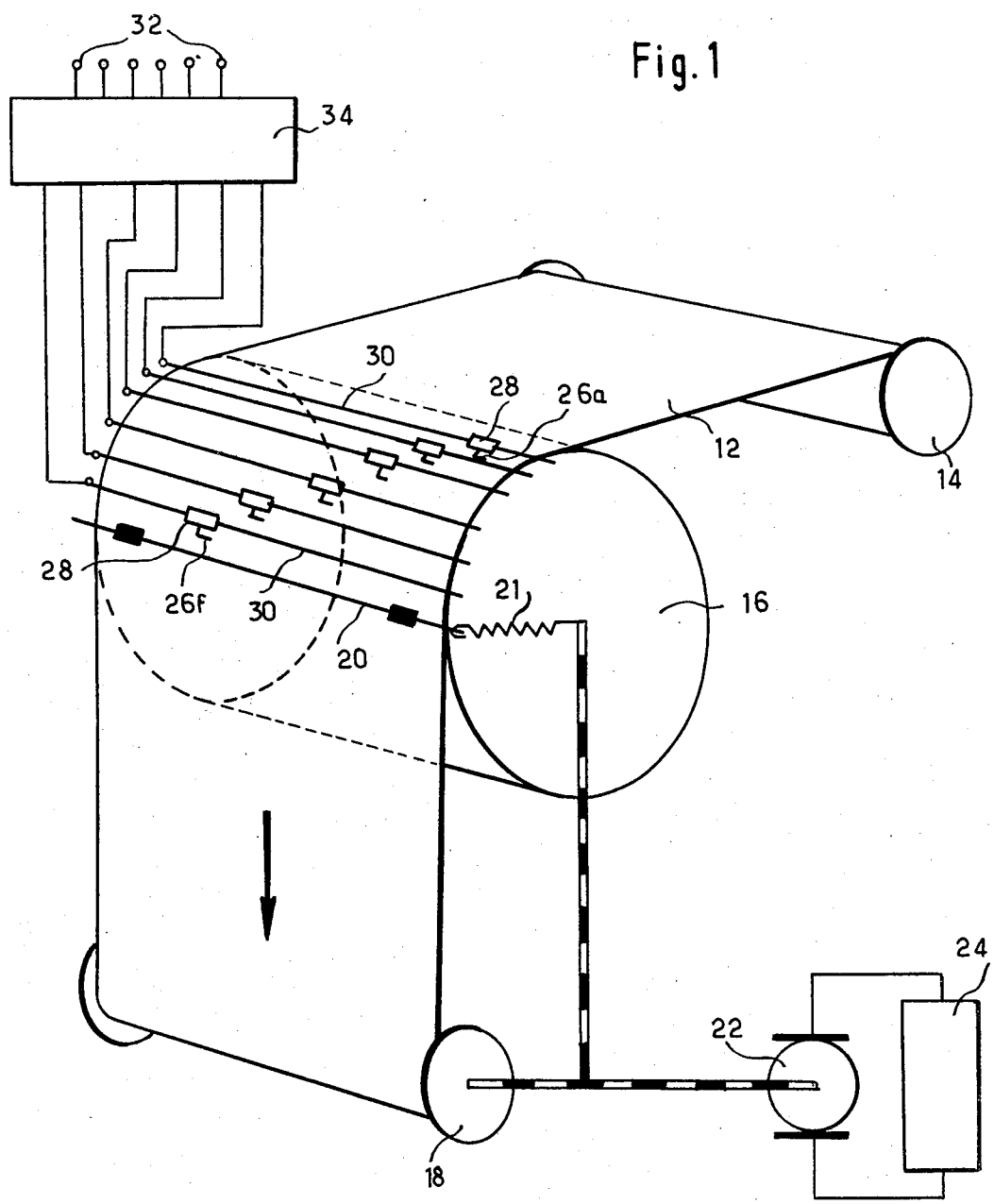
FIG. 1 is a schematic perspective diagram of the recorder.

Referring to FIG. 1, the chart recorder has a long strip paper chart 12 extending from a supply roller 14 round part of the circumference of a drive roller 16 to a take-up roller 18. A bar 20 carrying two pinch-rollers is urged by a spring 21 towards the surface of the chart 12 and the drive roller 16 to ensure positive frictional engagement of the roller 16 with the chart 12.

The drive roller 16 is driven by a motor 22 (for example, a stepping motor) under the control of a timing circuit 24 to advance the chart 12 at one of a number of selectable constant speeds, between, for example, 0.5 mm/minute and 500 mm/minute. The take-up roller 18 is also driven by the motor 22 via a friction clutch (not shown) which enables the roller 18 to take up any slack chart without overriding the constant-speed drive provided by the drive roller 16.

Six pens 26, each containing a different colour ink, are mounted in respective holders 18 which are carried by respective bars 30 extending across the width of the chart 12 above that portion of the chart 12 in contact with the drive roller 16. Each pen 26 can occupy any position acorss the full width of the chart 12 and bears thereupon to mark the chart 12 in accordance with its position. The positioning of the pens 26 relative to a datum position on the chart 12 (typically the centre or one edge of the chart 12) is controlled in accordance with the magnitude of a respective one of six input signals at input terminals 32, by a control and drive circuit 34. For example, this circuit 34 may have six servo-motors which move the holders 28 by pulley and cord systems and which each also move a potentiometer wiper which provides a feedback signal in accordance with the position of the motor shaft and therefore of the respective holder 28. The circuit 34 drives each motor to keep the respective input signals balanced by the respective feedback signals. Alternatively, the position of each holder 28 may be fed back by a linear potentiometer, alongside the bar 30, which has its wiper attached to the holder 28; and the servo-motors may be linear motors with their windings in the holders 28 co-operating with the bars 30. The construction and operation of these feedback servo-systems is well known, and need not be described in greater detail here.

As the chart 12 is steadily advanced by the motor 22, the pens 26 are moved across it in response to the respective input signals, so that each pen 26 traverses a respective locus of points representing the possible values of the respective input signal at any one time instant. In the case of the recorder shown in FIG. 1, these loci are straight lines parallel to the bars 30. Thus, the lateral position of each pen trace at successive locations along the chart 12 is indicative of the magnitude of the respective input signal at corresponding successive instants in time.

However, as illustrated in FIG. 1, the pens 26 are spaced from one another (for example, by 3 millimeters) longitudinally of the chart 12, in order that each pen 26 can traverse the full width of the chart 12 (to permit high-resolution recording) without obstructing or being obstructed by any other pen 26. Consequently, the loci traversed by the pens 26 are spaced from one another, with the result that events occurring simultaneously in the six input signals would be recorded on the chart 12 at positions spaced longitudinally, by the distance between the pen loci, that is 3 millimeters. Where interpretation of the chart recording involves comparison of simultaneous events in the different pen traces, this offset between each recording would make the traces so confusing as to be virtually impossible to understand.

Figure 2:
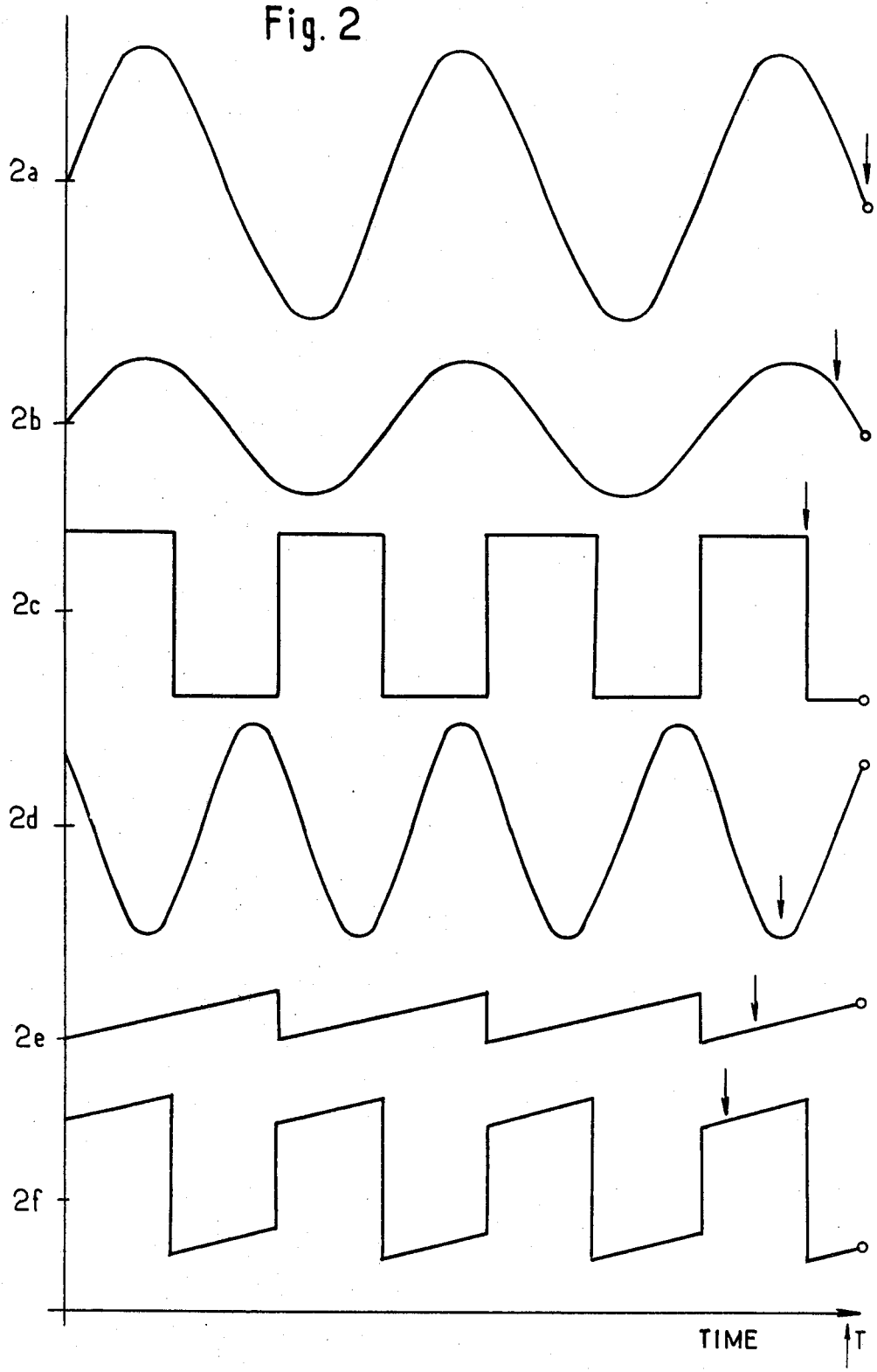
FIG. 2 is a waveform diagram of six periodic signals.
Figure 3:
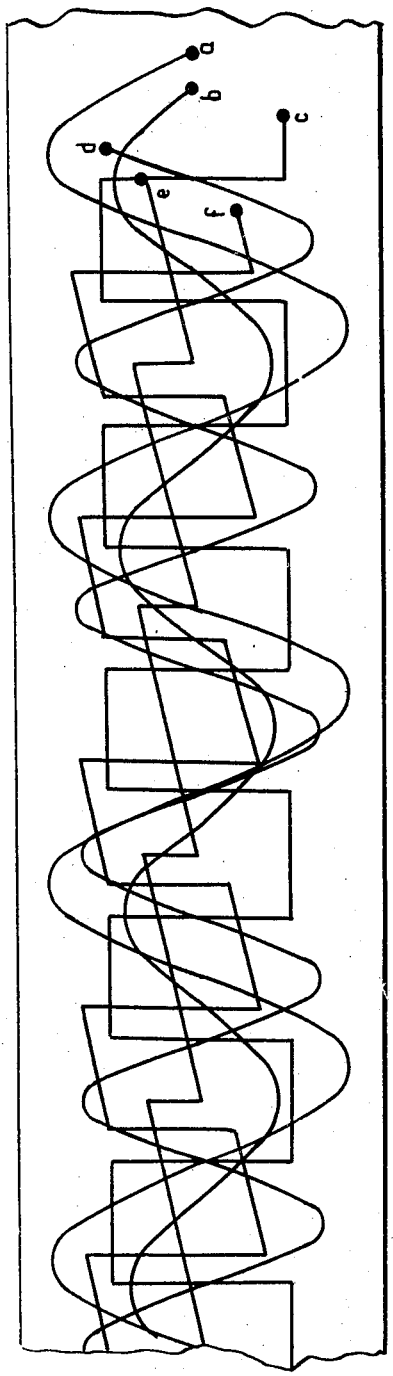
FIG. 3 illustrates a recording of the six signals of FIG. 2 as would be provided by a conventional recorder.

FIG. 2 shows six periodic signals and FIG. 3 illustrates a recording of these six input signals as would be provided by a conventional recorder constructed as thus far described. It can be seen that, even for the relatively simple, periodic signals shown in FIG. 2, little information on the relationships between signals can be derived by casual inspection, and even relative phase angles must be derived by careful calculation. For more complex signals, particularly at relatively high frequencies or low chart speeds, the time relationships of the various features of the signals become very difficult to determine.

To overcome this problem, a recorder in accordance with the present invention incorporates additional circuitry which is conveniently included in the control and drive circuit 34. One example of the circuit 34 is shown in FIG. 4.

Figure 4:
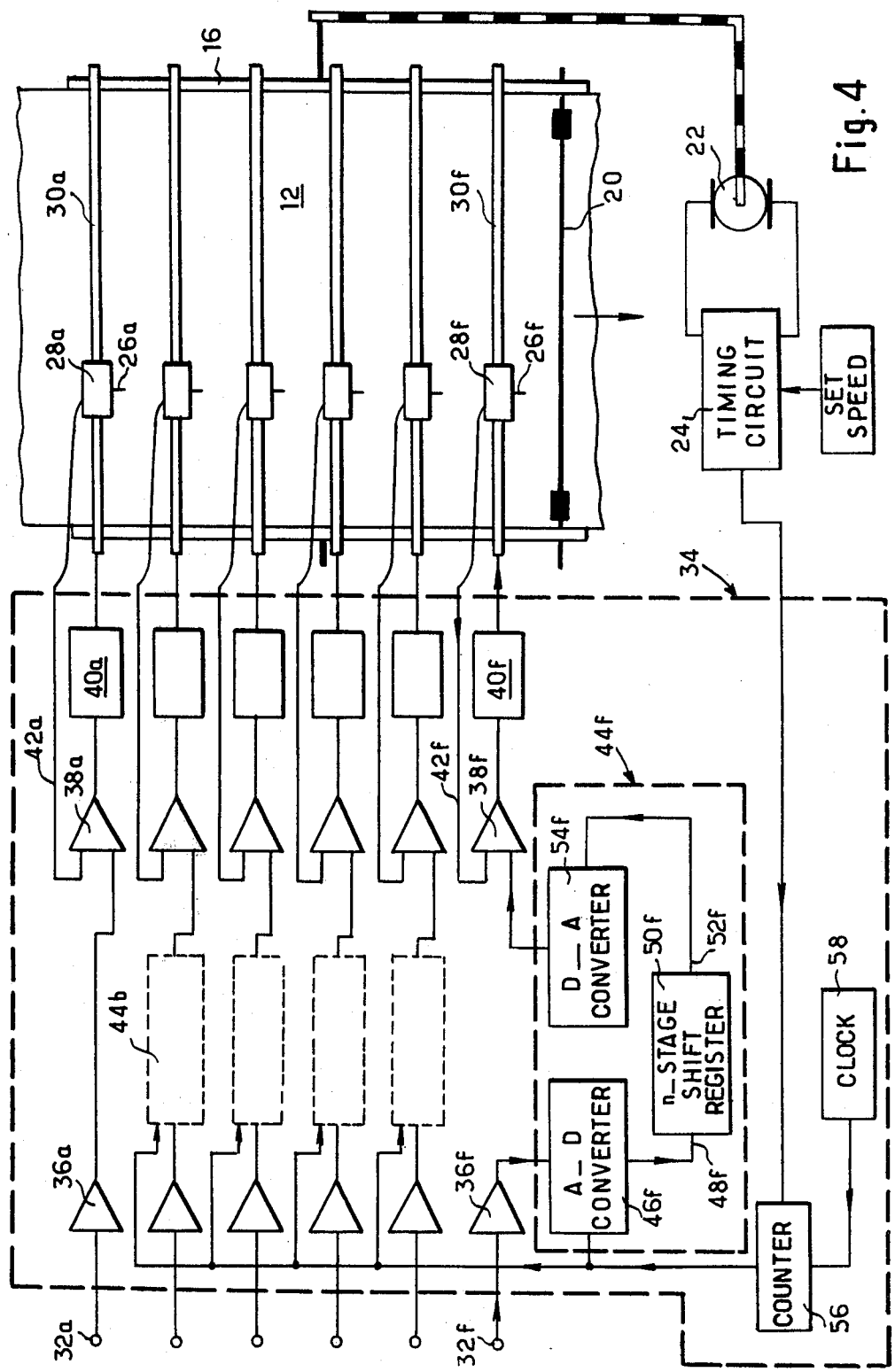
FIG. 4 shows a fragmentary plan view of part of the recorder of FIG. 1 and a block schematic diagram of associated circuitry.

Referring to FIG. 4, the six input terminals 32 are coupled to respective pre-amplifiers 36. The output of the pre-amplifier 36a is connected directly to one input of a servo-amplifier 38a which controls a motor 40a to position the holder 28a so that a position-feedback signal on a line 42a balances the signal from the pre-amplifier 36a, as described above. As shown in FIGS. 1 and 4, the pen 26a carried by the holder 28a is the first of the pens 26 to draw on the chart 12 as it is advanced by the drive roller 16.

The five pens 26b to 28f are likewise controlled by servo-amplifiers 38 and motors 40, but the signals from their associated pre-amplifiers 36 are supplied to the servo-amplifiers 38 via delay circuits 44. Since these circuits 44 are generally similar to one another in construction and operation, only the delay circuit 44f will be described in detail.

The signal from the pre-amplifier 36f is supplied within the delay circuit 44f to an analogue-to-digital converter 46f, which periodically samples this signal and supplies a 10-bit binary signal, representative of the magnitude of the pre-amplifier signal, to an input 48f of an n-stage shift register 50f. Each time a new 10-bit signal is supplied to the input 48f by the a–d converter 46f, the preceding 10-bit signals are shifted one stage away from the input 48f within the shift register 50f, and the nth-previous 10-bit signal is shifted out of the register 50f via its output 52f. This output 52f is coupled to a digital-to-analogue converter 54f which converts the 10-bit signal back to an analogue signal substantially equal in magnitude to the pre-amplifier signal from which the 10-bit digital signal was derived by the a–d converter 46f. The analogue signal from the d-a converter 54f is supplied to the servo-amplifier 38f for control of the position of the pen 26f.

The rate at which the a–d converter 46f samples the signal is controlled by a counter 56 within the control and drive circuit 34. This counter 56 is itself controlled by a signal from the timing circuit 24 indicative of the selected chart-advance speed, and counts pulses from a clock 58 having a typical frequency of 1 kHz. The signal from the timing circuit 24 varies the effective full-house count of the counter 56, from 4 at a chart speed of 500 mm/minute to 400 at a chart speed of 0.5 mm/minute, to vary, in accordance with the selection of chart speed, the number of clock pulses which the counter 56 must count before triggering the a-d converter 46f to sample the signal from the pre-amplifier 36f. Thus, at a chart speed of 500 mm/minute, the a-d converter 46f supplies 10-bit signals to the shift register 50f at the rate of 250 per second, whereas at a chart speed of 0.5 mm/minute, these signals are generated at the rate of only 1 every 4 seconds.

The variation in effective full-house count of the counter 56 can be accomplished, for example, by arranging for the signal from the timing circuit 24 to select the output of an appropriate one of several AND-gates, each AND-gate being responsive to the appropriate combination of stages of the counter 56 which together define one of the desired full-house counts. The selected AND-gate supplies both the trigger signal for the a-d converter 46f and a signal to reset the counter 56 to zero.

The shift register 50f performs the delay function within the delay circuit 44f, the length of the delay being dependent upon the number of stages in the shift register 50f and the rate at which signals are shifted through it—that is, the rate at which 10-bit signals are supplied by the a-d converter 46f.

The delay circuits 44b to 44e operate to sample and delay the signals from the respective pre-amplifier 36b to 36e, in response to the trigger signals from the counter 56, in the same way as the circuit 44f. However, the number of stages in each of the shift registers 50b to 50f differs as between them. Typically, the shift register 50b has 91 stages, the register 50c has 181 stages, and so on up to the shift register 50f with 451 stages. It will be noted that the number of stages is proportional to the spacing between the associated one of the pens 26b to 26f and the first pen 26a.

Considering again the delay circuit 44f, and a chart speed of 500 mm/minute, 250 samples/s are supplied to the shift register 50f, which has 451 stages and therefore provides a delay between first and last stages of 450/250=1.8 s. In this time the chart 12 is advanced a distance of 500×1.8/60=15 mm. The pens 26 are spaced 3 mm apart, so the total distance between the two pens 26a and 26f is 15 mm. Thus, the shift register 50f provides a delay equal to the time taken for any point on the chart 12 to advance from the locus traversed by the pen 26a to that traversed by the pen 26f. Since the rate of sampling by the a-d converter 46f is proportional to chart speed, this equality is maintained irrespective of chart speed. At a speed of 0.5 mm/minute, only 1 sample is taken every 4 seconds, so the 451 stages of the shift register 50f provides a delay of 450×4=1 800 s. The distance advanced by the chart 12 in 1 800 s is 0.5×1800/60=15 mm again.

Thus, two events occurring simultaneously in the input signals applied to the input terminals 32a and 32f are recorded at the same longitudinal position on the chart 12, because the event in the signal at the terminal 32a is directly effective on the pen 26a and is immediately recorded thereby on the portion of the chart 12 beneath the locus traversed by that pen 26a. However, the corresponding event in the signal at the terminal 32f is delayed by the shift register 50f for the time it takes that portion of the chart 12 to reach the pen 26f, whereupon the delayed event is recorded on the same portion.

The numbers of stages in the shift registers 50b to 50e are, as noted above, proportional to the spacings of the respective pens 26b to 26e from the first pen 26a. Thus, each shift register 50b to 50e likewise delays the respective signals at the corresponding input terminals 32b to 32e by the time taken for the chart 12 to advance the distance from the first pen 26a to the respective pen 26b to 26e.

Figure 5:
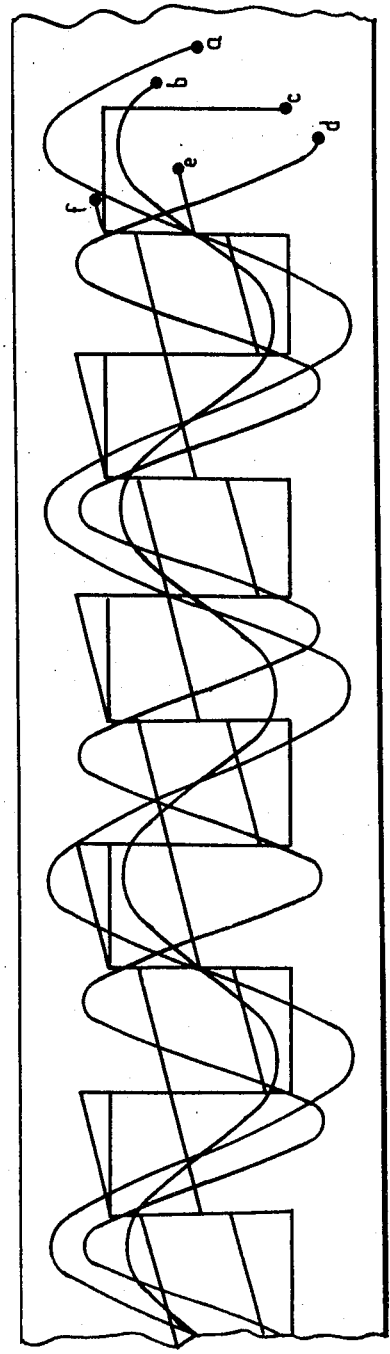
FIG. 5 illustrates a recording of the six signals of FIG. 2 as provided by the recorder in accordance with this invention.

FIG. 5 shows the resulting recording of the six signals shown in FIG. 2. It can be seen that the true phase relationships of the six signals are reproduced directly on the recording, in contrast to the spurious phase shifts in the conventional recording of FIG. 3. The right-hand ends of the traces in FIG. 5 illustrate the positions of the respective pens at a time T in FIG. 2, and show that only the pen 26a is at a position representative of the magnitude of the signal 2a at time T. The other pens 26b to 26f are at position representative of successively earlier, but delayed, magnitudes of the signals 2b to 2f, as indicated by arrows in FIG. 2. Since each pen 26a to 26f contains a different colour ink, it is possible in practice readily to distinguish the six traces, and at the same time discern immediately their time relationships.

Figure 6:
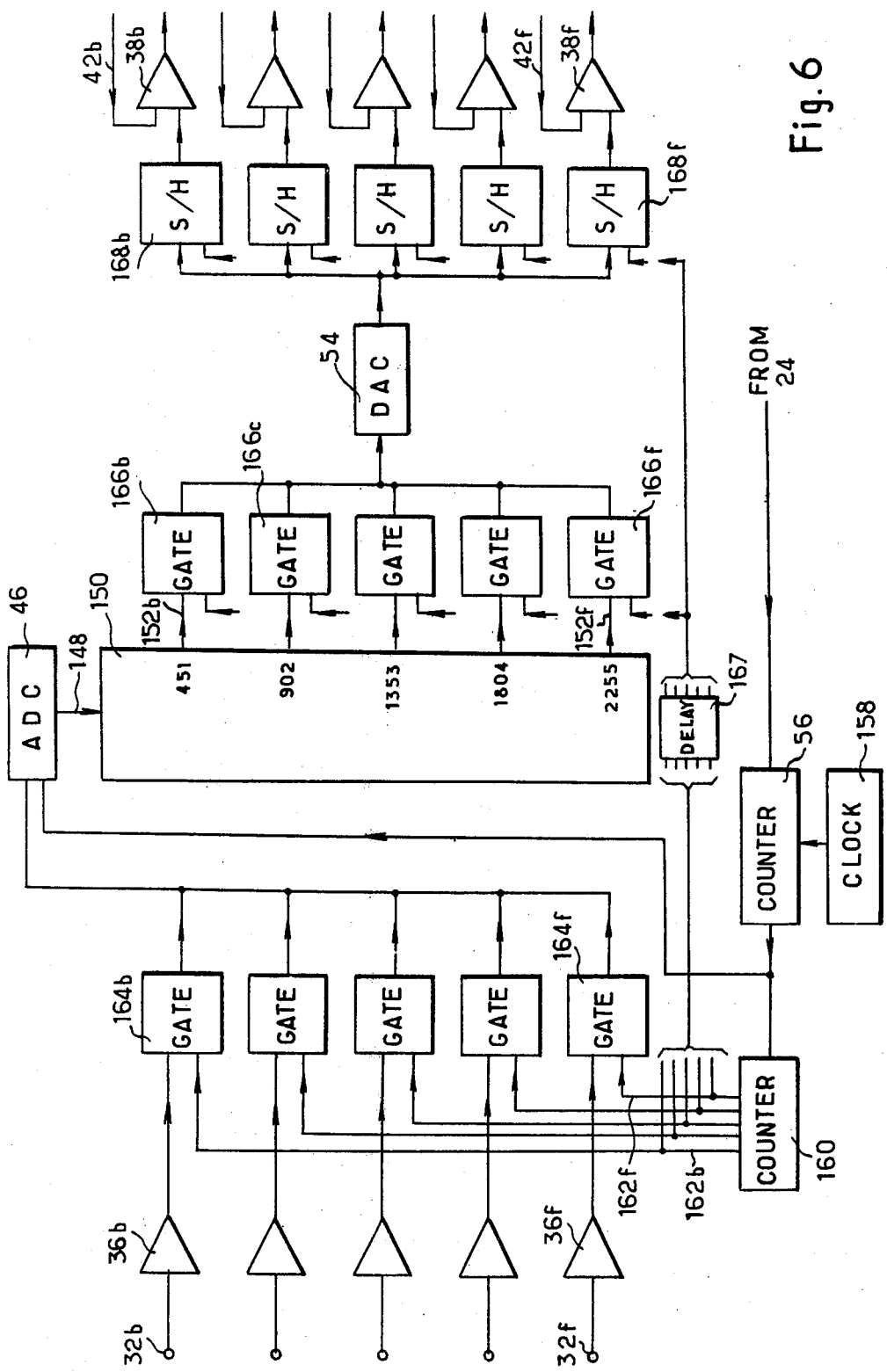
FIG. 6 is a block schematic diagram of a second version of the circuitry for the recorder of FIG. 1.

In order to reduce circuitry, it is possible to multiplex the five delayed signals through a common delay circuit, as shown in FIG. 6.

Referring to FIG. 6, the pre-amplifier 36 and the servo-amplifiers 38 are the same as in FIG. 4, but there is now only one a-d converter 46 and one d-a converter 54. The counter 56 is now supplied by a clock 158 having a typical frequency of 5 kHz. The trigger signals from the counter 56, comprising the clock signals divided by a factor between 4 and 400 in dependence upon the chart speed, are supplied to the a-d converter 46 and also to a second counter 160. This counter 160 has five outputs 162 connected to control respective gates 164. The inputs of the gates 164 receive signals from the respective pre-amplifiers 32, and their outputs are coupled together to the input of the a-d converter 46. The output of the a-d converter 46 is coupled to the input 148 of a 2255-stage shift register 150 which has outputs 152 from its 451st, 902nd, 1353rd, 1804th and 2255th stages coupled to respective gates 166. These gates 166 are controlled by the outputs 162 of the counter 160 in the same way as the gates 164, but via delay circuits 167. The outputs of the gates 166 are coupled together to the input of the d-a converter 54, and the output of this circuit supplies the inputs of five sample-and-hold circuits 168. Each sample-and-hold circuit 168 is triggered by a respective one of the outputs 162 of the counter 160 to sample the output signal from the d-a converter 54 and then, until triggered to take another sample, to maintain the sampled value of that signal at its output, which is coupled to a respective one of the servo-amplifiers 38.

In operation, the counter 160 responds to the trigger signals from the counter 56 to energise cyclically each of its outputs 162b to 162f in turn. When the output 162b is energised, the gate 164b is opened. Consequently, the output signal of the pre-amplifier 36b is coupled by the gate 164b to the a-d converter 46, which is simultaneously triggered by the counter 56 to sample this output signal and supply a 10-bit digital representation of it to the shift register 150, thus shifting the peviously-entered contents of the shift register 150 one stage away from its input 148. This process is repeated cyclically for each of the signals at the inputs 32b to 32f, so that the shift register 150 contains successive sets of five samples, with each set comprising one sample for each of the inputs 32. It will be noted that, as the clock 158 has a frequency five times that of the clock 58 in FIG. 4, the sampling rate for any one of the inputs 32 in FIG. 5 is the same as the sampling rate for that input 32 in FIG. 4, at the same chart speed.

When a sample of the input 32b is entered into the shift register 150 by the a-d converter 46, the consequent shift of the contents of the shift register 150 places the previous samples for that input 32b in the 6th, 11th, 16th, 21st etc. stages of the shift register 150. In particular, it places the 90th previous sample in the 451st stage, which is coupled to the gate 166b. This gate 166b is opened by the energisation of the output 162b shortly after that energisation opens the gate 164b, owing to the delay circuit 167b. This ensures that the sampling and conversion operation of the a-d converter 46 and the shifting in the shift register 150 is completed before the gate 166b opens.

The gate 166b supplies the contents of the 451st stage of the shift register 150 to the d-a converter 54 which then supplies the analogue equivalent to the sample-and-hold circuit 168b. This circuit 168b is simultaneously triggered by the delayed energisation of the output 162b to sample the analogue signal from the d-a converter 54 and supply it to the servo-amplifier 38b while the process is repeated for the signals at the other four inputs 32c to 32f.

The gates 166c to 166f are coupled to appropriate stages of the shift register 150 so that they only pass samples for the respective inputs 32c to 32f, and after successively longer delays.

Thus, the signal at the input 32b is delayed for the time taken to acquire 90 samples of that signal, the signal at the input 32c is delayed for 180 sample-periods, and so on, as in the circuit of FIG. 4.

Figure 7:
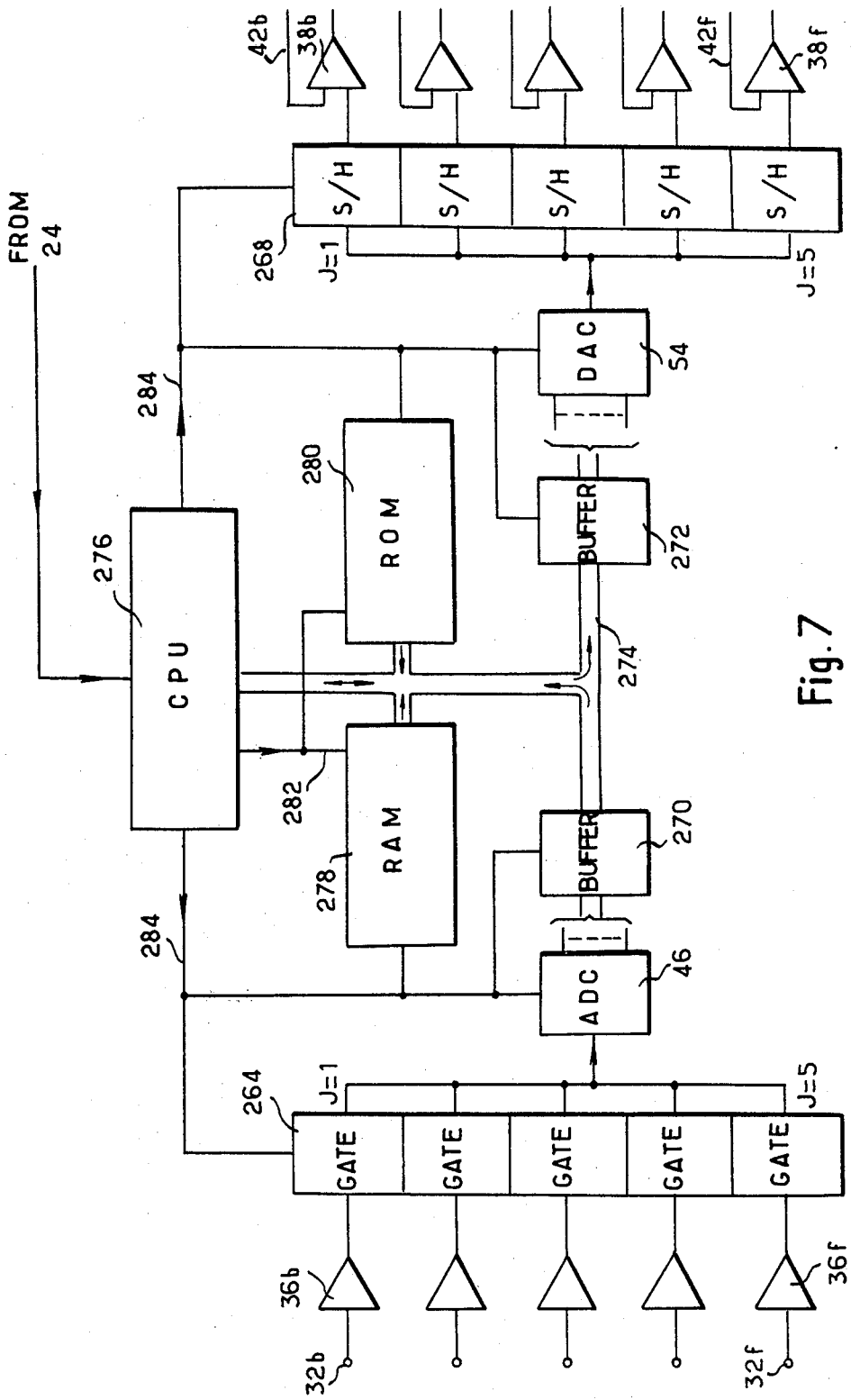
FIG. 7 is a block schematic diagram of a third version of the circuitry for the recorder of FIG. 1.

Instead of using shift registers, it is possible to provide the desired delays by means of a random-access memory (using magnetic-core or semiconductor storage techniques) controlled by a microprocessor, as shown in FIG. 7.

Referring to FIG. 7, the pre-amplifiers 36 are coupled to respective gates 264 generally similar to the gates 164 in FIG. 6. The outputs of the gates 264 are coupled together to the input of the a-d converter 46, the 10-bit output of which is coupled to a buffer circuit 270. A similar buffer circuit 272 supplies delayed 10-bit signals to the d-a converter 54, the output of which feeds sample-and-hold circuits 268 which drive the servo-amplifiers 38.

The output of the buffer circuit 270 and the input of the buffer circuit 272 are coupled to a 10-line data highway 274 which is also connected to a central processing unit 276, random-access memory 278 and read-only memory 280. The CPU 276 also has an address highway 282 for operating the RAM 278 and the ROM 280, and a control highway 284 for controlling the gates 264, the a-d converter 46, the buffer circuits 270 and 272, the d-a converter 54, the sample-and-hold circuits 268 and the memories 278 and 280.

The details of operation of a microprocessor are well known and need not be discussed in detail. Briefly, the CPU 276 is responsive to a program of instructions stored in the ROM 180 to carry out a sequence of operations defined by those instructions and involving the selective operation of the other circuits via the control highway 284. In particular, the values of successive samples of each of the signals at the input terminals 32 are stored in digital form in the RAM 278 and then read out again after an appropriate delay for control of the positions of the pens 26 by the servo-amplifiers 38. The multiplexing of the operation of the converters 46 and 54 by means of the gates 264 and the sample-and-hold circuits 268 is generally similar to that in FIG. 6.

Figure 8:
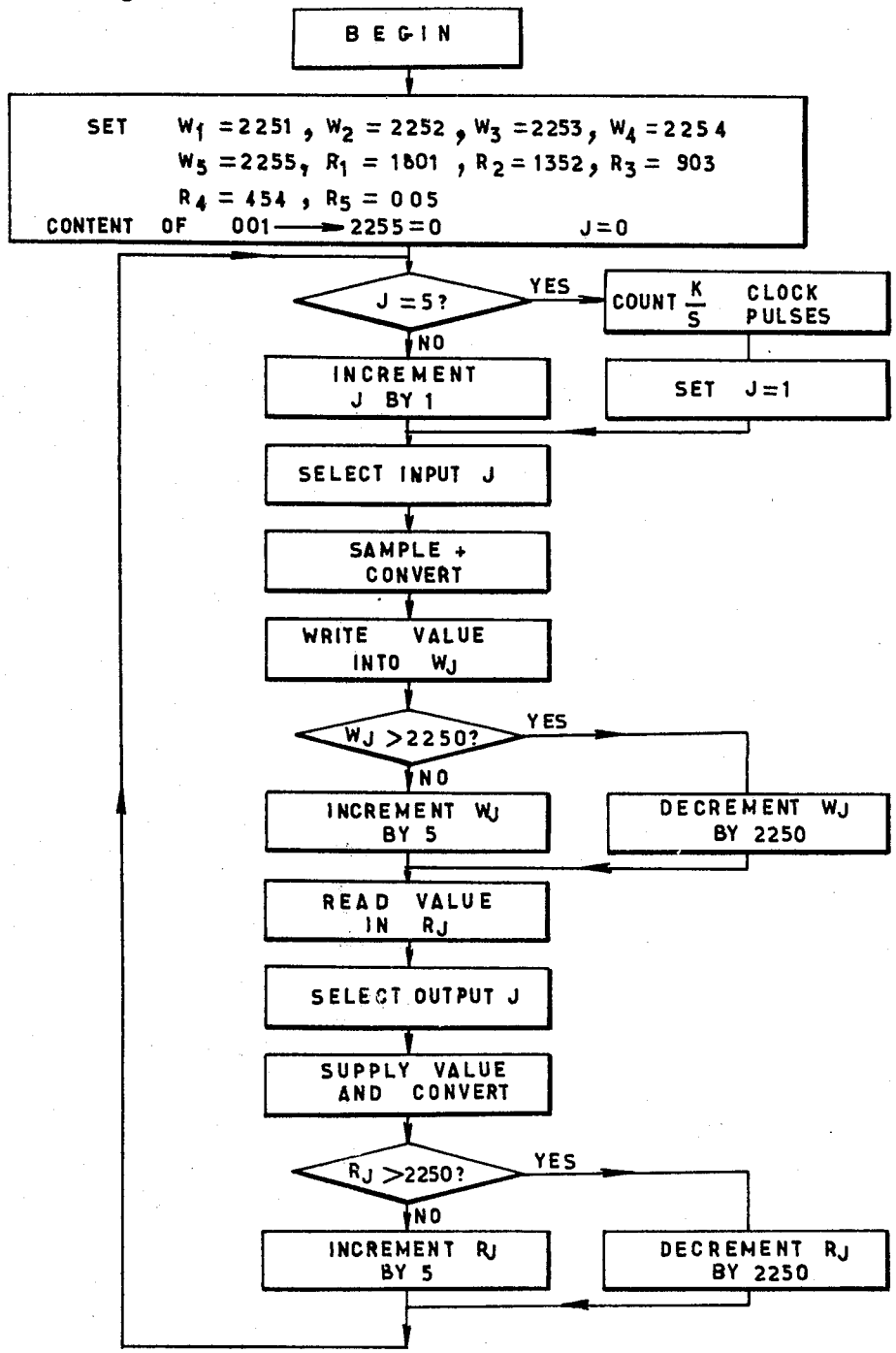
FIG. 8 is a flow diagram of the operation of the circuitry of FIG. 7.

A flow diagram outlining the operations defined by the program of instructions is shown in FIG. 8. In FIG. 8, W and R are indices supplied to the RAM 278 by the CPU 276 on the address highway 282 to define numerical addresses of storage locations within the RAM 278 at which data is to be written in and read out respectively. J is another index which is incremented cyclically from 1 to 5 to effect sampling and supply of samples for each of the input terminals 32b to 32f successively. After each such cycle, the CPU counts k/S pulses from the clock which synchronises the operation of the microprocessor, before commencing another cycle. S is dependent upon the chart speed and k is a constant chosen to give the appropriate delay between sampling cycles, in accordance with chart speed. Thus the total delay for the signal at any one terminal 32 is determined by this delay and the spacing between the W and R indices for that terminal—this spacing defines the number of sampling cycles between the storage of a sample and its extraction and supply to the d-a converter 54.

If the servo-systems for controlling the pens 26 are based on digital instead of analogue techniques, it is possible to dispense with the d-a converter 54 in the circuits described above. In all the circuits it is preferable for the clock (58, 158 or in the CPU 276) to be referenced to the supply (for example, the mains supply) from which the power for the chart drive motor 22 is derived.

Although the invention has been described in relation to a six-pen strip-chart recorder, it is equally applicable to any other recorder having two or more pens offset from one another; the chart may be circular; and the chart may be fixed (as in a two-pen X-Y plotter in which the pens move along the Y axis on a carriage moveable along the X axis).

In the foregoing description of FIGS. 4 and 6, it is assumed that the shift registers 50 and 150 are multi-bit digital devices. As an alternative, analogue charge-transfer devices, such as charge-coupled devices, could be used, in which case the a-d converters 46 and the d-a converters 54 would be unnecessary.

We claim:

1. A recorder for recording a plurality of input signals as a function of a common parameter, comprising; a record support member for supporting recordings; first recording means and at least a second recording means, each arranged to produce on said support member, in response to a respective one of said input signals, a record in accordance with the value of said input signal along a respective locus of points representing possible values of said input signal for any one value of said parameter; means arranged to effect relative movement, having a component transverse to said loci, between said member and said recording means in accordance with the value of said parameter, the locus containing a record produced by said second recording means being spaced in the direction of said relative movement from the locus containing a record produced simultaneously by said first recording means; and means arranged to delay the recording by said second recording means of the value of the associated input signal for any one value of said parameter, relative to the recording by said first recording means of the value of the associated input signal for the same value of said parameter, whereby the respective loci containing records for that value of said parameter are coincident upon said member; the delay means having means arranged to store successive samples of the input signal associated with the second recording means, control means arranged to produce a periodic signal having a frequency dependent upon the speed of said relative movement, and output means arranged to receive from the storage means each said sample after an interval equal to a predetermined number of cycles of said periodic signal following the storage of that sample, whereby said second recording means produces a record corresponding to that sample with a delay, relative to the recording of the input signal associated with said first recording means for the same value of said parameter, determined by said predetermined number and the frequency of said periodic signal.

2. A recorder according to claim 1, wherein said storage means is responsive to said control means to store said samples at the frequency of said periodic signal, whereby each sample is received by said output means after a number of samples equal to said predetermined number have been stored.

3. A recorder according to claim 1, wherein said storage means has at least said predetermined number of storage locations each arranged to store one sample.

4. A recorder according to claim 3, wherein said storage means is responsive to said control means to store a sample in a new storage location in response to each cycle of said periodic signal.

5. A recorder according to claim 4, wherein said storage means includes means arranged to supply said samples sequentially to an input storage location at the frequency of periodic signal, and means arranged to transfer each said stored sample from one storage location to the next each time a sample is supplied to the input storage location, the storage locations being in series, whereby each sample is sequentially transferred to an output storage location coupled to said output means.

6. A recorder according to claim 4, wherein said storage means includes input means arranged to supply each successive sample to a respective storage location and said output means includes means arranged to inspect each storage location sequentially after said respective interval.

7. A recorder according to claim 6, wherein the storage means has said predetermined number of storage locations, said input means is responsive to said control means to supply successive samples to said storage locations cyclically, and said inspection means is responsive to said control means to re-inspect each storage location after the sequential inspection of each of the other storage locations at the frequency of said periodic signal.

8. A recorder according to any one of claims 1-7, wherein said control means comprises a pulse generator the pulse repetition frequency of which is dependent upon the speed of said relative movement.

9. A recorder according to any one of claims 1-7, including means arranged to sample the input signal associated with said second recording means and to supply said samples to said storage means, at the frequency of said periodic signal.

10. A recorder according to any one of claims 1-7, wherein said samples are in digital form and said output means includes means for converting successive samples received from storage means into analogue form.

11. A recorder according to claim 1, including third recording means associated with a third input signal, wherein said storage means is arranged to store successive samples of said third input signal and said output means is arranged to receive each said sample of said third input signal from said storage means after a second interval equal to a second and different predetermined number of cycles of said periodic signal, whereby said third recording means produces records corresponding to said samples of said third input signal with a delay, relative to the recording of the input signal associated with said first recording means for the same value of said parameter, determined by said second predetermined number and the frequency of said periodic signal, and whereby the respective loci containing records for that value of said parameter are coincident upon said member.

12. A recorder according to claim 11, wherein said storage means is responsive to the control means to store alternately samples of the input signals associated with the second and third recording means at the frequency of said periodic signal.

13. A recorder according to claim 12, wherein said storage means has at least the sum of said first and second predetermined numbers of storage locations.

* * * * *